United States Patent Office 2,760,623
Patented Aug. 28, 1956

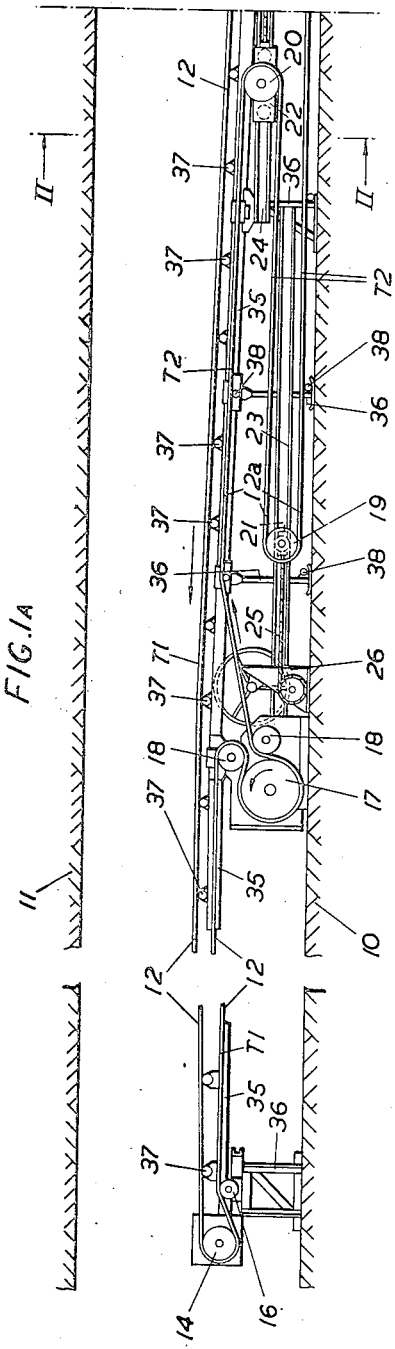

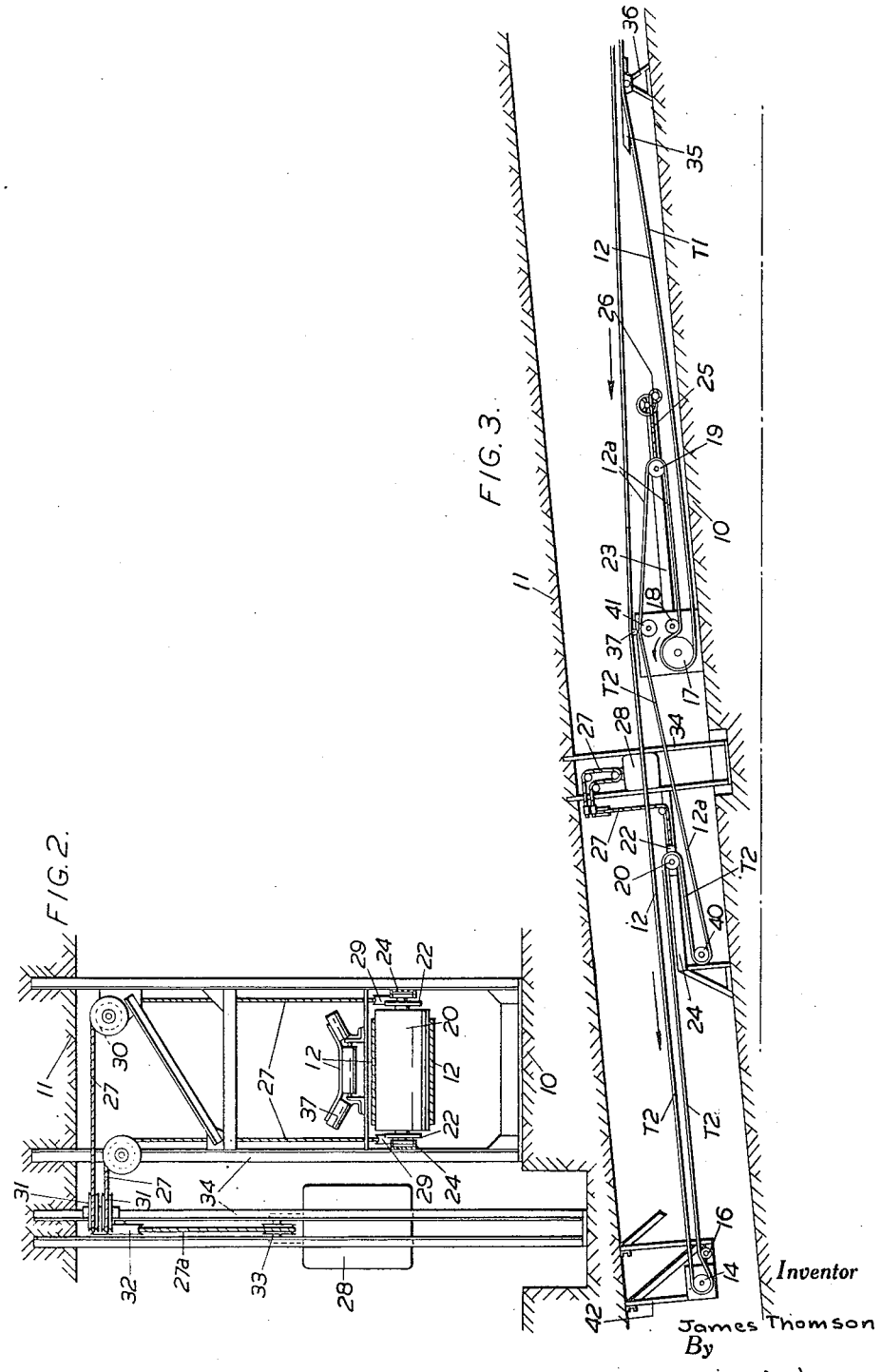

2,760,623

ENDLESS BELT CONVEYORS

James Thomson, Glasgow, Scotland, assignor to Mavor & Coulson Limited, Glasgow, Scotland Application November 21, 1952, Serial No. 321,811

5 Claims. (Cl. 198—208)

This invention relates to endless belt conveyors, especially but not exclusively such conveyors as used in coal-mines, of the type having a so-called "loop take-up"; that is to say, the working run of the belt receives and delivers the material to be conveyed, whereas the return run of the belt is formed into a loop of variable length, the purpose of which is to permit the overall length of the conveyor to be varied without need for inserting or removing a corresponding length of belt.

Provision must be made for maintaining the belt tension despite stretch of the belt. In practice, allowance is made for a stretch of one per cent. In a long conveyor, therefore, this provision for stretch must be considerable; that is, in a conveyor belt one thousand feet long, one must provide for a stretch of ten feet.

In conveyors of the type stated, the various stretches of the belt are subjected to either of two tensions, namely a greater tension usually represented by the symbol "T1" and a lesser tension represented by "T2." As regards the conveyor driving pulley gear, the incoming and outgoing stretches are subjected to these different tensions.

In a known conveyor of the type stated, the loop take-up is formed by two pulleys which are spaced apart and one of which is movable under the control of a positive adjustment device, such as a winch, to vary the loop length. The tension can be maintained at the proper values by lengthening or shortening the loop, but this action necessitates operation of the winch connected to one of the loop-forming pulleys.

According to the present invention, an endless belt conveyor of the type stated has a self-tensioning loop take-up system formed on its return run by pulleys which are spaced apart, one loop-forming pulley being movable by a positive adjustment device in either direction lengthwise of the conveyor to vary the length of the loop system as required by changes in the length of the conveyor and another loop-forming pulley being movable lengthwise of the conveyor under a continuously applied load to maintain the lesser tension T2 of the conveyor belt at a predetermined value despite changes in the greater tension T1.

Examples of an endless belt conveyor according to the invention designed for use in a coal mine are shown in the accompanying drawings, in which:

Figs. 1A and 1B together comprise a sectional side elevation of one example of the conveyor, the details of which for simplicity and clarity are shown diagrammatically. Fig. 1A shows that portion of the conveyor which includes the coal-delivery end, and Fig. 1B shows the other portion of the conveyor which includes the coal-receiving end.

Fig. 2 is a section, to a larger scale, on the line 2—2 of Fig. 1A.

Fig. 3 is a diagram showing another example, which is in effect a modification of the arrangement according to Figs. 1A and 1B.

Referring to Figs. 1A, 1B and 2, the mine floor is indicated by 10 and the roof by 11. In this the conveyor belt 12 is led around terminal pulleys 13 and 14 respectively at the coal-receiving and delivery ends of the conveyor and between which the upper conveying and lower return runs of the belt both extend. Belt-training pulleys 15 and 16 are as usual fitted in association with the terminal pulleys. The driving pulley gear is applied to the return or lower run of the belt and comprises a driving pulley 17 connected to a geared motor (not shown) and two associated guide pulleys 18 which lead the belt to and from the driving pulley. The loop 12a of the take-up is also applied to the return run of the belt and at that stretch thereof outgoing from the driving pulley. The loop system of the take-up is formed by two pulleys 19 and 20 which are journalled in separate carriage bearings 21 and 22 movable respectively along guideways 23 and 24 incorporated in the conveyor framework and arranged lengthwise of the conveyor and on both sides thereof. Thus, the two loop-forming pulleys can move to and from one another within the range allowed by the guideways. The carriage bearings 21 are connected by flexible wire ropes 25 at both sides of the conveyor to a positive adjustment device, namely a winch 26, by operation of which the pulley 19 can be pulled towards the adjacent ends of the guideways 23. The carriage bearings 22 are connected also by a flexible wire rope 27 to a heavy body 28, the weight of which pulls the pulley 20 towards the ends of the guideways 24 which are remote from the pulley 19.

The wire rope 27 comprises a single length having its ends connected to the carriage bearings 22 of the pulley 20 on each side of the conveyor. From these bearings the rope passes firstly round two pulleys 29, secondly upwardly and round pulleys 30, thirdly across and round pulleys 31, fourthly across and over pulleys 32 and finally is suspended as a loop 27a (Fig. 1B) round a pulley 33 attached to the body 28. This single-rope arrangement ensures equalization of loading on the two carriage bearings 22.

A structure 34, erected between the mine floor and roof, provides a mounting for the pulleys 29 to 32 inclusive and also a vertical guideway wherein the body 28 is slidable.

The loop take-up system incorporates a double loop 12a, the belt being led from the driving pulley 17, over the guide pulley 18 and then to and around the more remote of the loop-forming pulleys, viz 20, wherefrom it is led back to and around the nearer pulley 19, finally passing therefrom towards the terminal pulley 13 at the receiving end of the conveyor.

In Figs. 1A and 1B, the belt stretches subjected to the greater tension customary in belt conveyors are indicated by T1, whereas the stretches subjected to the lesser tension are indicated by T2. It will be seen that the take-up loop 12a comprises stretches outgoing from the driving pulley gear and subjected to the lesser tension. The incoming stretch of the return run, extending from the pulley 14 to the driving pulley 17, is subjected the greater tension.

The conveyor frame sections 35 in the example are shown carried by floor structures generally denoted by 36, the belt-troughing idler roller assemblies for the conveying run of the belt being denoted by 37 and the idler rollers for the return run of the belt by 38.

The coal receiving hopper of the conveyor is shown at 39.

In use of the conveyor, the winch 26 is operated to pull the loop-forming pulleys 19 and 20, lengthwise of the conveyor, into positions in which the tensioning body 28 is lifted perpendicularly to the conveyor to an appropriate level in its guideway. Thereafter, as the major belt tension T1 varies due to load variations and to stretching, the loaded pulley 20 will move to-and-fro and will thus maintain the lesser belt tension T2 constant, no matter what may be the position of the pulley 19.

It will be obvious that although the loop take-up system is applied to the lower run of the conveyor belt, the body 28 and its guide structure 34 are arranged laterally clear of the conveyor, so that the requisite tension is transmitted to the pulley 20 without obstruction from the upper run of the conveyor belt.

The conveyor described in the foregoing example is suitable for substantially level road working and for uphill working. For appreciably downhill working, however, owing to the marked gravitational effect of the load being conveyed, not only the upper conveying stretch of the belt is subjected to the lesser tension T2 but so also are the lower incoming stretches extending from the terminal pulley 14 at the delivery end of the conveyor to the driving pulley 17. On the other hand, the lower outgoing stretches extending from the driving pulley 17 to the terminal pulley 13 at the coal-receiving end are subjected to the greater tension T1. Accordingly, in a conveyor designed for appreciably downhill working, it is essential that the loop take-up system shall be applied to the incoming lower stretches extending between the pulleys 14 and 17.

Fig. 3 shows such a conveyor. The coal-receiving end, not being affected, is not shown.

Referring to Fig. 3, in this example the return run of the belt 12 passes from the terminal pulley 14 over the pulley 16 and round the pulley 20 to a fixed pulley 40, thus forming a take-up 12a.

From the pulley 40 the belt passes to and over a guide pulley 41 and thence round the pulley 19 to the guide pulley 18 and driving pulley 17 to form a second take-up loop 12a, the belt thereupon passing towards a terminal pulley (corresponding to the pulley 13 shown in Fig. 1B).

The pulleys 19 and 20 are as in the first example respectively connected by wire ropes 25 and 27 to the winch 26 and the heavy body 28.

Endless belt conveyors according to the invention may be carried by floor structures such as those shown at 36 in the drawings, by roof-structures such as partly shown at 42 in Fig. 3, or by a combination of floor and roof structures.

It will be manifest that the invention provides an endless belt conveyor with a loop take-up system which will automatically maintain the return run of the belt under a predetermined constant tension, no matter what length of excess belt is stored for the time being in the take-up system, by a simple tensioning device the range of action of which is short in comparison with the range of the take-up action.

I claim:

1. A long continuously travelling endless belt conveyor of the type stated comprising a framework, an upper working run of the belt, roller assemblies which are supported by said framework and which support the working run and form it like a trough, a lower return run of the belt, a driving gear applied to the lower return run, pulleys spaced apart below the upper run and supporting the return run, a positive adjustment device applied to one of said pulleys for moving it lengthwise of the conveyor to form a take-up loop of variable length in the lower run, said pulleys including another loop-forming pulley which is mounted to be movable lengthwise of the conveyor in order to maintain at a predetermined value a lesser tension in the conveyor belt despite changes in the load applied to the working run, guideways incorporated in said framework and extending lengthwise of the conveyor, bearings slidable along said guideways, said two movable loop-forming pulleys being journalled in said bearings respectively, a perpendicular structure standing laterally clear of the conveyor belt, said structure rising above the level of the upper working run beside it, a heavy body movable up and down in and under guidance of said structure between limits above and below both runs, and tension-transmitting means of connection extending between said other loop-forming pulley and said heavy body, said means of connection being trained from said heavy body between the upper and lower runs to apply the requisite tension to the latter pulley.

2. An endless belt conveyor according to claim 1 in which the working run conveys in a direction between substantially level and uphill and in which the return belt stretch coming into the driving gear is at the greater tension, whereas the outgoing return stretches are at the lesser tension, and in which the loop system is incorporated in said outgoing return stretches.

3. An endless belt conveyor according to claim 2 in which the loop system incorporates a double loop formed by stretches from the driving pulley gear to one of the movable pulleys, from this movable pulley to the other of the movable pulleys and from this other movable pulleys towards the receiving end of the conveyor.

4. An endless belt conveyor according to claim 1 in which the working run conveys appreciably downhill and in which the return belt stretch going out from the driving gear is at the greater tension, whereas the incoming return stretches are at the lesser tension, and in which the loop system is incorporated in said incoming return stretches.

5. An endless belt conveyor according to claim 4 in which the loop take-up system incorporates two loops formed by stretches from the delivery end of the conveyor to one of the movable pulleys, from this movable pulley to another pulley, from this other pulley to the other of the movable pulleys and from this other movable pulley towards the driving pulley gear.

References Cited in the file of this patent

UNITED STATES PATENTS

| 723,504 | Titus | Mar. 24, 1903 |
| 1,317,997 | Stuart | Oct. 7, 1919 |
| 2,179,187 | Kendall | Nov. 7, 1939 |

FOREIGN PATENTS

| 332,271 | Great Britain | July 15, 1930 |
| 471,353 | Great Britain | Sept. 2, 1937 |